(12) United States Patent
Scholz et al.

(10) Patent No.: US 11,958,402 B2
(45) Date of Patent: Apr. 16, 2024

(54) LIGHTING DEVICE FOR A VEHICLE

(71) Applicant: HELLA GmbH & Co. KGaA, Lippstadt (DE)

(72) Inventors: Sebastian Scholz, Soest (DE); Ralf Seiger, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/229,708

(22) Filed: Aug. 3, 2023

(65) Prior Publication Data

US 2023/0373381 A1 Nov. 23, 2023

Related U.S. Application Data

(63) Continuation of application No. PCT/EP2022/051829, filed on Jan. 27, 2022.

(30) Foreign Application Priority Data

Feb. 4, 2021 (DE) ...................... 10 2021 102 631.8

(51) Int. Cl.
   *B60Q 1/068* (2006.01)
(52) U.S. Cl.
   CPC ........ *B60Q 1/0683* (2013.01); *B60Q 2200/32* (2013.01)
(58) Field of Classification Search
   CPC .................... B60Q 1/0683; B60Q 2200/32
   See application file for complete search history.

(56) References Cited

U.S. PATENT DOCUMENTS

| | | | |
|---|---|---|---|
| 4,270,367 A | | 6/1981 | Santore |
| 4,599,681 A | * | 7/1986 | McMahan ............ B60Q 1/0683 362/543 |
| 9,463,529 B2 | * | 10/2016 | Miyamoto ............. B23K 26/03 |
| 10,272,820 B2 | * | 4/2019 | Burton ................... B60Q 1/068 |

(Continued)

FOREIGN PATENT DOCUMENTS

| | | |
|---|---|---|
| DE | 3429040 A1 | 2/1986 |
| DE | 19923635 A1 | 11/2000 |

(Continued)

OTHER PUBLICATIONS

International Search Report dated Sep. 5, 2022 in corresponding application PCT/EP2022/051829.

*Primary Examiner* — Thomas M Sember
(74) *Attorney, Agent, or Firm* — Muncy, Geissler, Olds & Lowe, P.C.

(57) ABSTRACT

A lighting device for a vehicle, having a housing, at least one light module for producing a light function, a supporting frame that is arranged in the housing so as to be pivotable. The at least one light module is mounted in the supporting frame such that it is pivoted upon a pivoting of the supporting frame. An adjuster is designed to pivot the supporting frame about a vertical axis. The adjuster being connected to the supporting frame in a first engagement region and in a second engagement region that is arranged horizontally on the opposite side of the supporting frame. The adjuster moving the supporting frame in a first horizontal direction in the first engagement region and to simultaneously move it in a second horizontal direction, which is opposite to the first direction, in the second engagement region.

16 Claims, 4 Drawing Sheets

(56) References Cited

U.S. PATENT DOCUMENTS

2008/0043482 A1    2/2008  Leitretter et al.
2014/0003080 A1*  1/2014  King .................... B60Q 1/0683
                                                         362/525

FOREIGN PATENT DOCUMENTS

| | | |
|---|---|---|
| DE | 10211816 A1 | 10/2003 |
| DE | 102004061483 A1 | 6/2006 |
| DE | 102008011718 A1 | 9/2009 |
| DE | 202010011852 U1 | 11/2010 |
| DE | 102012022082 A1 | 5/2014 |
| DE | 102014007865 A1 | 12/2015 |
| EP | 0908352 A1 | 4/1999 |
| FR | 2956895 A1 | 9/2011 |
| GB | 616781 A | 1/1949 |
| NL | 8900699 A | 10/1990 |

* cited by examiner

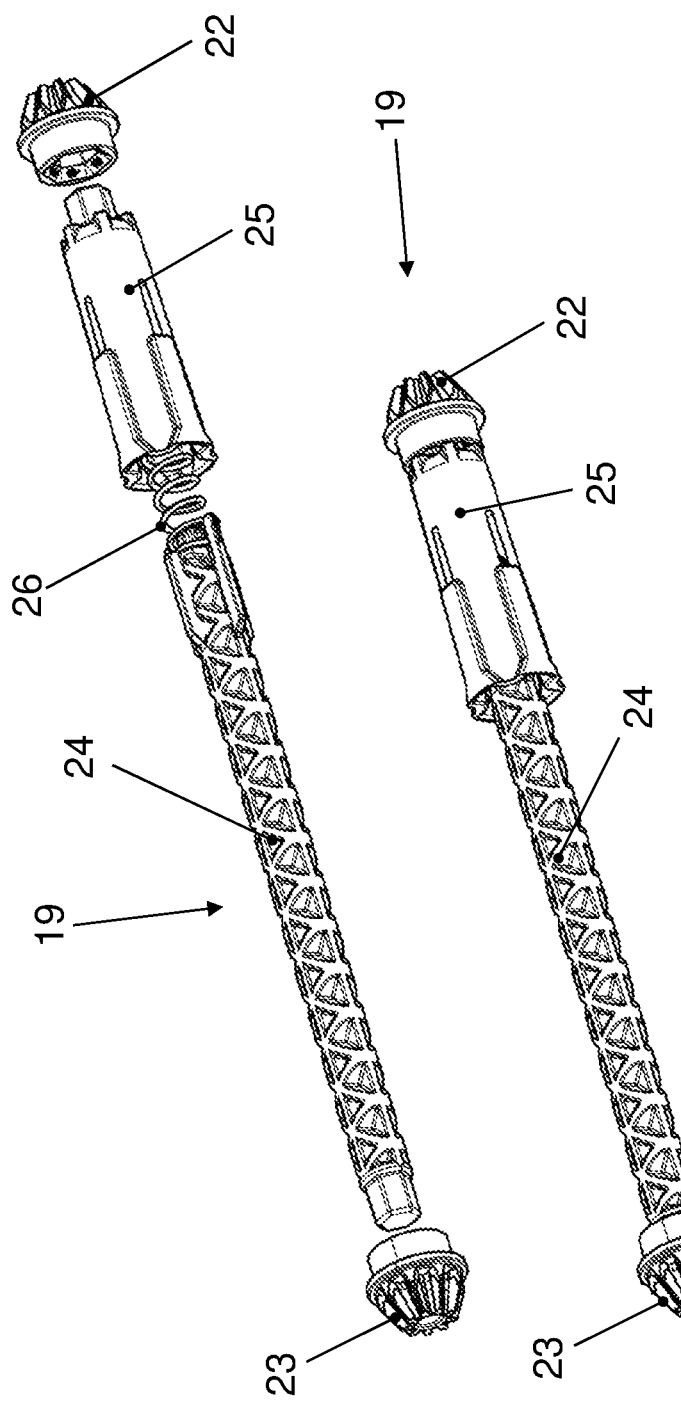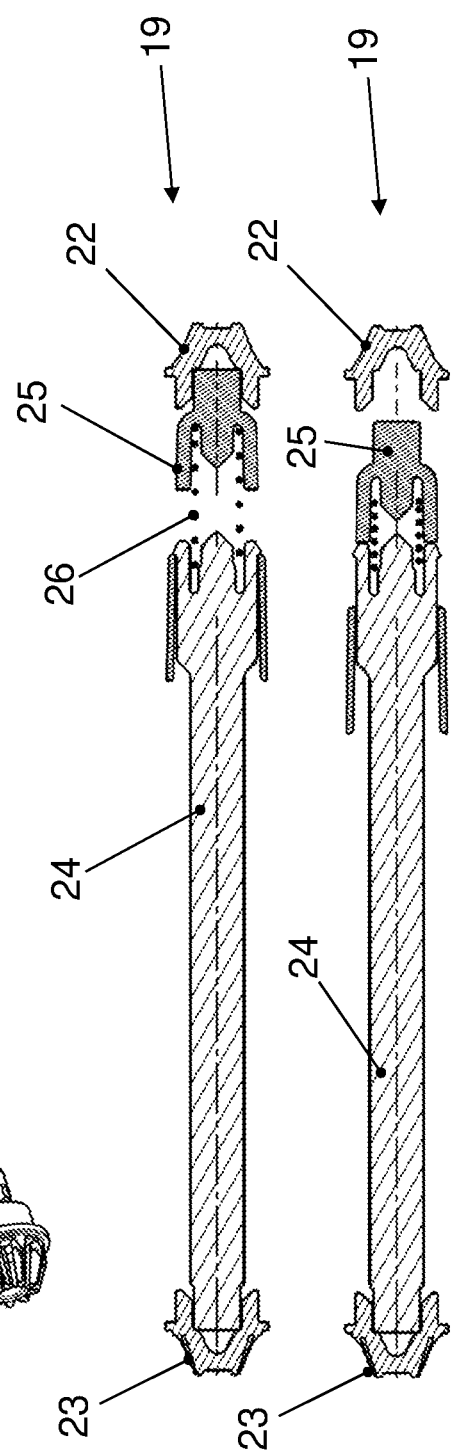
Fig. 4
Fig. 5
Fig. 6
Fig. 7

US 11,958,402 B2

LIGHTING DEVICE FOR A VEHICLE

This nonprovisional application is a continuation of International Application No. PCT/EP2022/051829, which was filed on Jan. 27, 2022, and which claims priority to German Patent Application No. 10 2021 102 631.8, which was filed in Germany on Feb. 4, 2021, and which are both herein incorporated by reference.

BACKGROUND OF THE INVENTION

Field of the Invention

The present invention relates to a lighting device for a vehicle, in particular a headlamp for a vehicle.

Description of the Background Art

A headlamp is known from DE 102 11 816 A1, which is incorporated herein by reference. The headlamp described therein includes a housing, in which a supporting frame is arranged so as to be pivotable in the horizontal and vertical directions. Two light modules are mounted in the supporting frame in such a manner that they are likewise pivoted upon a pivoting of the supporting frame. The light modules serve to produce the "low beam" and "high beam" lighting functions. In addition, an adjuster is provided that is configured to pivot the supporting frame about a vertical axis in order to adjust the headlamp or the light distribution produced by the headlamp.

In the conventional designs, the adjuster engages at one side of the supporting frame and pivots the supporting frame about a pivot point arranged on the opposite side of the supporting frame. On account of this configuration, long pivot distances on the side at which the adjuster engages can arise during adjustment of the headlamp. These possible long pivot distances must be taken into account in the design of the headlamp, so the headlamp has relatively large dimensions.

SUMMARY OF THE INVENTION

It is therefore an object of the present invention to provide a lighting device that can be made more compact.

In an example, provision is made that the adjuster is connected to the supporting frame in a first engagement region and in a second engagement region that is arranged horizontally on the opposite side of the supporting frame, wherein the adjuster is configured to move the supporting frame in a first horizontal direction in the first engagement region and to simultaneously move it in a second horizontal direction, which is opposite to the first direction, in the second engagement region. As a result, each of the two sides of the supporting frame need only travel a pivot distance that is half as long as with the single-sided pivoting in the prior art to achieve the same pivot angle during adjustment of the lighting device. This permits a more compact construction of the lighting device, because the design of the headlamp need only take into account pivot distances that are half as long.

Provision can be made that the adjuster includes two adjusting elements that are each connected to the supporting frame in one of the engagement regions. In this case, the housing can include two guides for the adjusting elements, wherein the guides are arranged on horizontally opposite sides of the supporting frame.

The possibility exists that the supporting frame includes two connecting elements that are each arranged in one of the engagement regions of the supporting frame. In this case, each of the two connecting elements can have a connecting region that is designed at least partially as a ball head, in particular.

Provision can be made that each of the two adjusting elements can be connected to one of the connecting elements. In this case, each of the two adjusting elements can have a receptacle for the connecting region of the associated connecting element, in particular wherein the receptacle is designed at least partially as a socket corresponding to the ball head. Owing, in particular, to the at least partially ball-shaped geometry of the connecting regions on the connecting elements and of the receptacles on the adjusting elements, the connecting elements, and thus the supporting frame, can execute a rotary motion despite a translational motion of the adjusting elements moved in the guides of the housing.

The possibility exists that the adjuster includes two threaded spindles, each of which cooperates with one of the two adjusting elements in such a manner that a rotational motion of the threaded spindle can be transferred to the associated adjusting element, in particular is transferred to a translational motion of the associated adjusting element. For this purpose, each of the adjusting elements can have, on its end facing away from the respective engagement region of the supporting frame, an internal thread that meshes with one of the threaded spindles.

Provision can be made that the two adjusting elements are coupled to one another in such a manner that the second of the adjusting elements can be moved in the second horizontal direction when the first of the adjusting elements is moved in the first horizontal direction, and that the second of the adjusting elements is moved in the first horizontal direction when the first of the adjusting elements is moved in the second horizontal direction. In this case, the coupling can be designed such that the adjustment distances traveled by the two adjusting elements are equal. It is ensured by means of the coupling that the pivoting of the supporting frame takes place at the same time on both sides and that, in particular, the pivot distances traveled by the supporting frame are equal on both sides.

Provision is made that the adjuster can include a shaft that is detachable without tools. The tool-free detachability of a shaft of the adjuster can ensure the accessibility of other components of the lighting device in order to be able to replace them more easily in the event of service. This configuration can also permit a more compact construction of the lighting device, because installation space can be saved that otherwise would be required to ensure accessibility.

Provision can be made that the shaft includes two parts that are movable toward one another in the axial direction of the shaft against the force of a spring, in particular wherein the length of the shaft is reduced by a movement of the parts toward one another such that it can be removed. The shaft is easily removable as a result of such a configuration.

The possibility exists that the shaft couples the two adjusting elements to one another. For this purpose, the shaft can be indirectly or directly connected at each of its ends to one of the threaded spindles such that a rotational motion of one of the two threaded spindles is transferred through the shaft to the other of the two threaded spindles. An easily implemented and reliable coupling of the adjusting elements is created by this means.

Provision can be made that the lighting device has a control element for horizontal adjustment of the supporting frame, which element is indirectly or directly connected to one of the threaded spindles such that a rotational motion of the control element is transferred to one of the two threaded spindles. The simultaneous connection of the threaded spindles through the shaft achieves the result that operation of the control element causes both adjusting elements to be moved and the supporting frame with the at least one light module to be pivoted correspondingly.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 4 is an exploded view of the detachable shaft of the lighting device from FIG. 1;

FIG. 5 is a perspective view of the shaft from FIG. 4;

FIG. 6 is a longitudinal section through the shaft from FIG. 4 with the two parts of the shaft that are movable toward one another in the position suitable for operation; and FIG. 7 is a longitudinal section through the shaft from FIG. 4 with the two parts of the shaft that are movable toward one another in the position suitable for detachment.

DETAILED DESCRIPTION

The lighting device depicted in the figures is designed as a headlamp, and includes at least one light module, preferably multiple light modules (which are not depicted), for producing a multiplicity of lighting functions. In particular, the lighting functions are a low beam and a high beam. It is absolutely possible for additional lighting functions, such as, e.g., a daytime running light, to be integrated in the headlamp.

Figure 1:
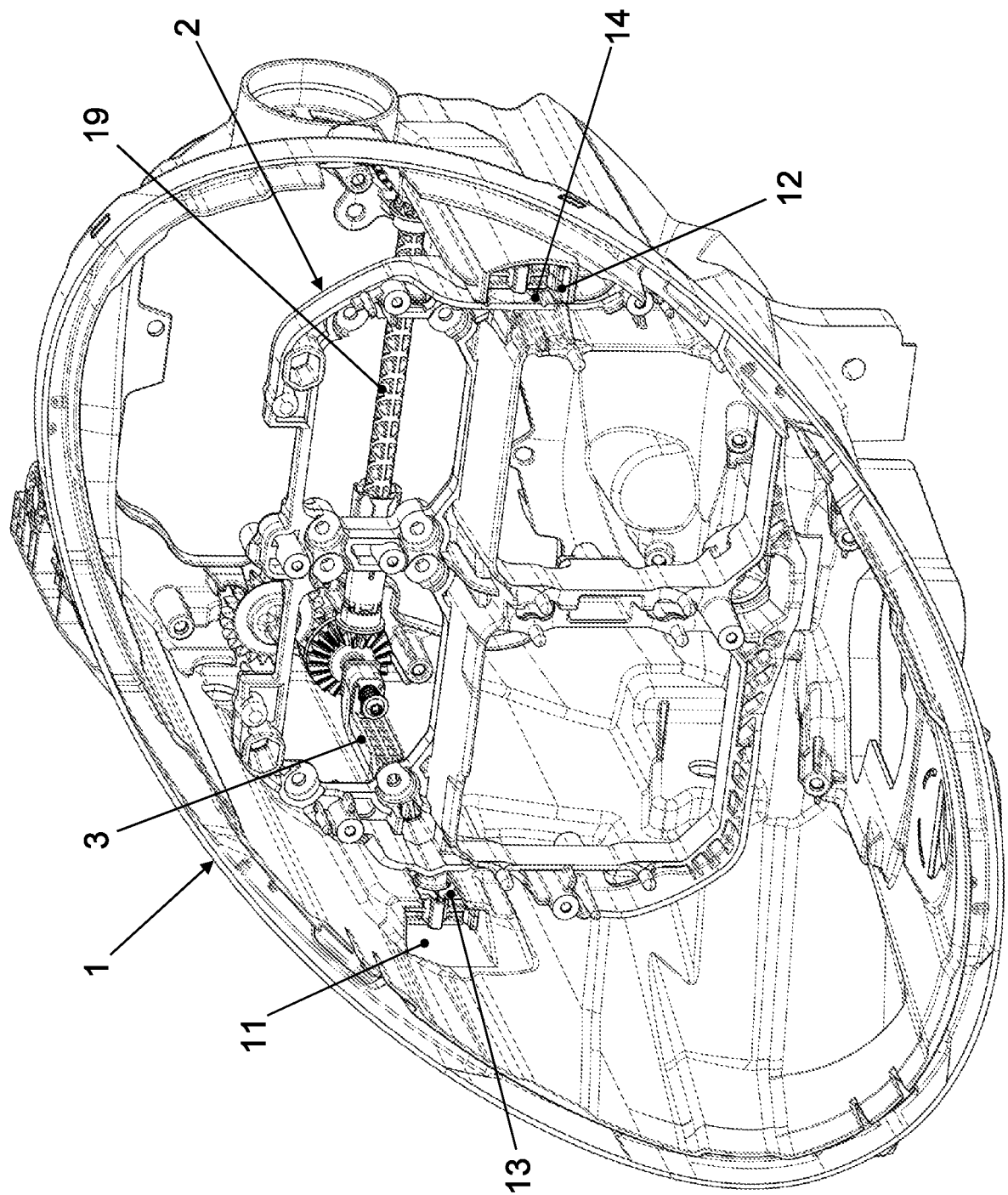
FIG. 1 is a perspective view of parts of a lighting device according to the invention.
Figure 2:
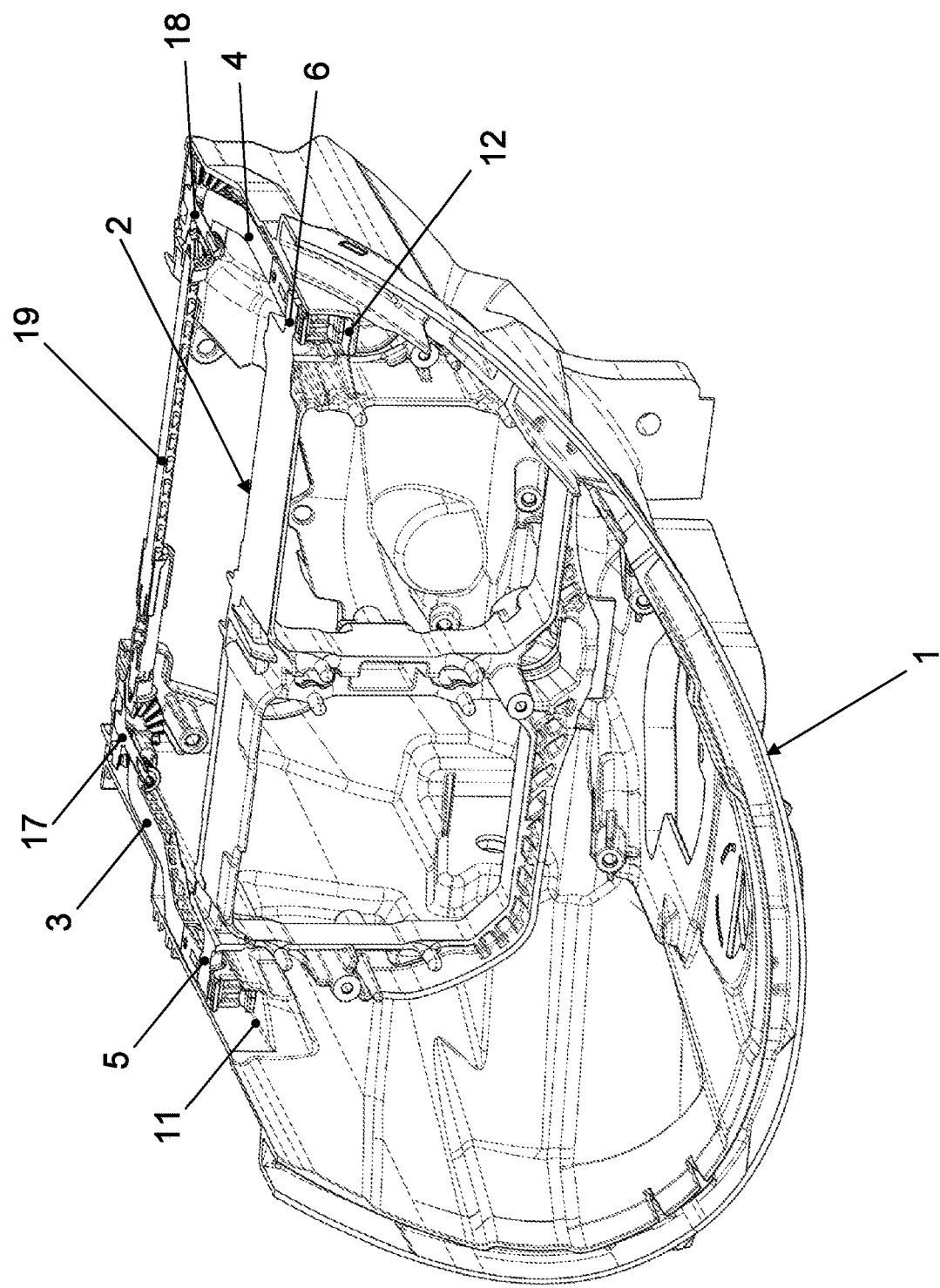
FIG. 2 is a view of the lighting device corresponding to FIG. 1 and sectioned in a horizontal plane, wherein the section plane passes through the adjusting elements and the detachable shaft.

The lighting device includes a housing 1, only parts of which are depicted in the figures (see FIG. 1 and FIG. 2, in particular). The lighting device additionally includes a supporting frame 2, which is arranged in the housing 1 so as to be horizontally and vertically pivotable. The at least one light module is mounted in or on the supporting frame 2 in such a manner that it is likewise pivoted when the supporting frame 2 pivots.

The lighting device additionally includes an adjuster that is designed to pivot the supporting frame 2 about a vertical axis. For this purpose, the adjuster is connected to the supporting frame 2 in a first engagement region and in a second engagement region that is arranged horizontally on the opposite side of the supporting frame 2. The adjuster has two adjusting elements 3, 4, that are each connected to the supporting frame 2 in an engagement region. Two connecting elements 5, 6, which interact with the adjusting elements 3, 4 (see FIG. 2 and FIG. 3), are mounted on the supporting frame for this purpose.

Each of the two connecting elements 5, 6 has a connecting region 7, 8, that is designed at least partially as a ball head. Accordingly, each of the two adjusting elements 3, 4 has a receptacle 9, 10 for the connecting region 7, 8 of the associated connecting element 5, 6, wherein the receptacle 9, 10 is designed at least partially as a socket corresponding to the ball head.

The adjusting elements 3, 4 are designed as elongated struts that have an essentially rectangular cross section and are slightly offset in a middle region. The housing 1 includes two guides 11, 12 for the adjusting elements 3, 4, wherein the guides are arranged on horizontally opposite sides of the supporting frame. Each of the adjusting elements 3, 4 can be moved in the associated guide 11, 12 in the longitudinal direction, or in the direction corresponding to its longitudinal extent. In this case, each of the guides 11, 12 encloses the associated adjusting elements 3, 4, leaving free only a slot 13, 14 extending in the longitudinal direction that the respective connecting element 5, 6 of the supporting frame 2 extends through (see FIG. 1). Consequently, the adjusting elements 3, 4 cannot move laterally, or can only do so to an insignificant degree, during a movement in their longitudinal direction.

Figure 3:
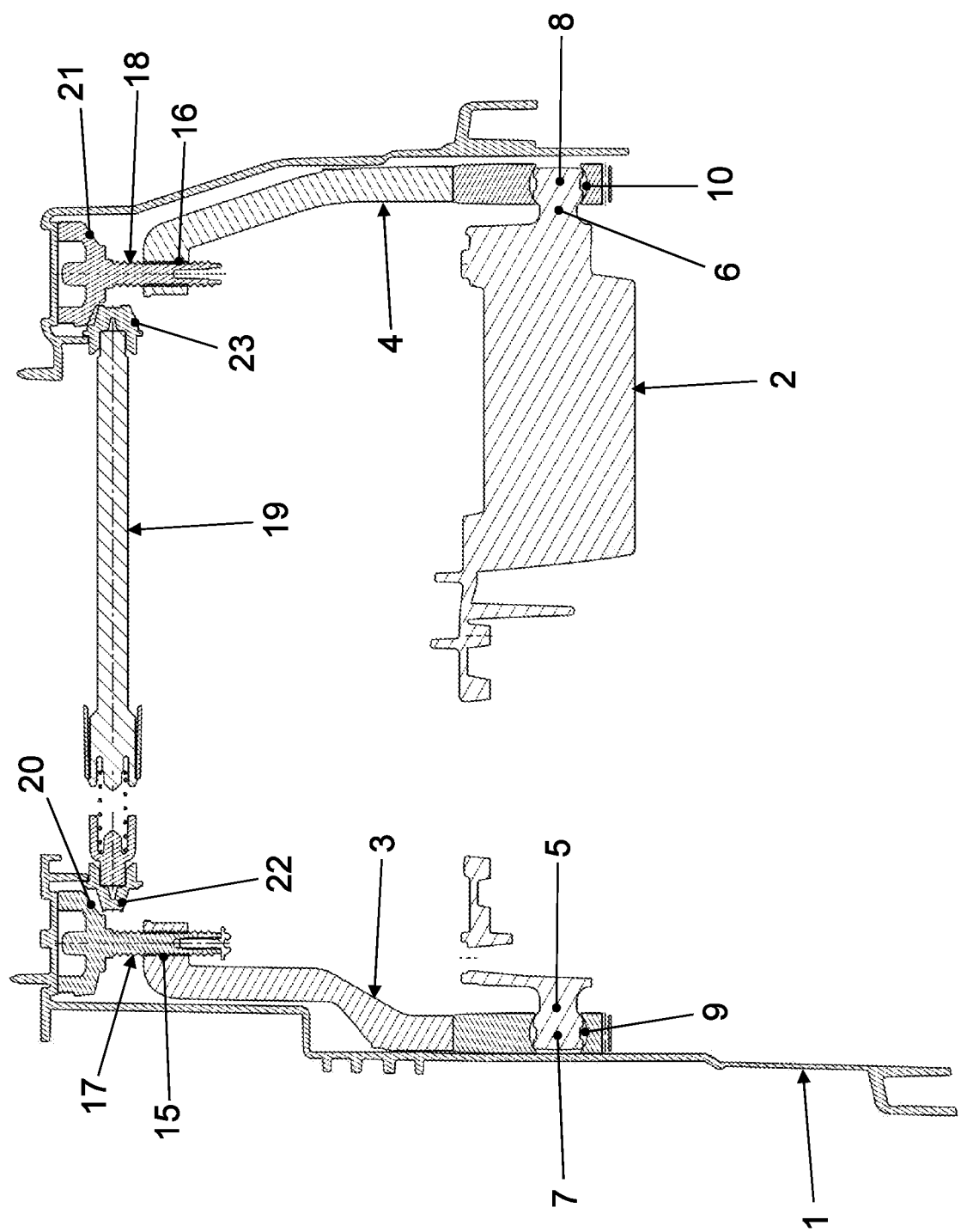
FIG. 3 is a sectional view of the horizontal plane from FIG. 2.

Each of the adjusting elements 3, 4 has, in one of its end regions, namely in the lower end region in FIG. 3, the receptacle 9, 10 for the associated connecting element 5, 6, and has an internal thread 15, 16 at the other end region, the upper one in FIG. 3. The adjuster additionally includes two threaded spindles 17, 18, each of which meshes with one of the internal threads 15, 16, so that a rotational motion of the respective threaded spindle 17, 18 is transferred to a translational motion of the associated adjusting element 3, 4.

The adjuster additionally includes a shaft 19 that is connected at each of its ends to one of the threaded spindles 17, 18 such that a rotational motion of one of the two threaded spindles 17, 18 is transferred through the shaft 19 to the other of the two threaded spindles 17, 18. For this purpose, both the shaft 19 and the two threaded spindles 17, 18 have, at their ends, bevel gears 20, 21, 22, 23 that are each provided with gear teeth, wherein the bevel gears 22, 23 of the shaft 19 each mesh with the bevel gear 20, 21 of the associated threaded spindle 17, 18.

A simple and reliable coupling of the adjusting elements 3, 4 is produced by the shaft 19. In this case, the two adjusting elements 3, 4 are coupled to one another such that the adjusting element 4 on the right in FIG. 3 is moved upward in FIG. 3 upon a movement downward in FIG. 3 of the adjusting element 3 on the left in FIG. 3 and, respectively, the adjusting element 3 on the left in FIG. 3 is moved upward in FIG. 3 upon a movement downward in FIG. 3 of the adjusting element 4 on the right in FIG. 3. In particular, the coupling in this case is designed such that the adjustment distances traveled by the two adjusting elements 3, 4 are equal.

It is ensured by means of the coupling that the pivoting of the supporting frame 2 takes place at the same time on both sides in opposite directions and that, in particular, the pivot distances traveled by the supporting frame 2 are equal on both sides. Owing to the at least partially ball-shaped geometry of the connecting regions 7, 8 on the connecting elements 5, 6 and of the receptacles 9, 10 on the adjusting elements 3, 4, the connecting elements 5, 6, and thus the supporting frame 2, can execute a rotary motion despite a translational motion of the adjusting elements 3, 4 moved in the guides 11, 12 of the housing 1.

The lighting device additionally includes a control element for horizontal adjustment of the supporting frame 2. This control element is indirectly connected to one of the threaded spindles 17, 18 through a multiplicity of gears such that a rotational motion of the control element is transferred to one of the two threaded spindles 17, 18. The simultaneous connection of the threaded spindles 17, 18 through the shaft 19 achieves the result that operation of the control element causes both adjusting elements 3, 4 to be moved and the supporting frame 2 with the at least one light module to be pivoted correspondingly.

The shaft 19 depicted in detail in FIG. 4 to FIG. 7 has two parts 24, 25 that are movable relative to one another in the axial direction of the shaft 19 against the force of a spring 26. FIG. 6 shows the shaft 19 in an operating position, in which the parts 24, 25 are pushed away from each other by the force of the spring 26, and the shaft 19 fills the space between the two bevel gears 22, 23 on the ends. FIG. 7 shows the shaft 19 in a position in which the two parts 24, 25 are pushed together against the force of the spring 26. In this position, the part 25 on the right in FIG. 7 is moved out of the end bevel gear 22, so that the shaft 19 can be easily detached or removed from the lighting device in this position of the two parts 24, 25 relative to one another. This tool-free detachability of the shaft 19 can ensure the accessibility of other components, such as, e.g., the light modules, in order to be able to replace them more easily in the event of service.

Alternatively, provision can be made that, when the two parts 24, 25 are pushed together against the force of the spring 26, the end bevel gear 22 is also moved therewith, so that the shaft 19 can be removed together with the bevel gear 22 as a result.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:
    a housing;
    at least one light module for producing a light function;
    a supporting frame arranged in the housing so as to be pivotable, the at least one light module being mounted in the supporting frame such that it is pivoted upon a pivoting of the supporting frame; and
    an adjuster that pivots the supporting frame about a vertical axis, the adjuster being connected to the supporting frame in a first engagement region and in a second engagement region that is arranged horizontally on an opposite side of the supporting frame,
    wherein the adjuster is configured to move the supporting frame in a first horizontal direction in the first engagement region and to simultaneously move it in a second horizontal direction, which is opposite to the first direction, in the second engagement region.

2. The lighting device according to claim 1, wherein the adjuster includes two adjusting elements that are each connected to the supporting frame in one of the engagement regions.

3. The lighting device according to claim 2, wherein the housing includes two guides for the adjusting elements, and wherein the guides are arranged on horizontally opposite sides of the supporting frame.

4. The lighting device according to claim 2, wherein the adjuster includes two threaded spindles, each of which cooperates with one of the two adjusting elements such that a rotational motion of the threaded spindle is transferred to the associated adjusting element or is transferred to a translational motion of the associated adjusting element.

5. The lighting device according to claim 4, wherein each of the adjusting elements has, on its end facing away from the respective engagement region of the supporting frame, an internal thread that meshes with one of the threaded spindles.

6. The lighting device according to claim 2, wherein the two adjusting elements are coupled to one another in such a manner that the second of the adjusting elements is moved in the second horizontal direction when the first of the adjusting elements is moved in the first horizontal direction, and wherein the second of the adjusting elements is moved in the first horizontal direction when the first of the adjusting elements is moved in the second horizontal direction.

7. The lighting device according to claim 1, wherein the supporting frame includes two connecting elements that are each arranged in one of the engagement regions of the supporting frame.

8. The lighting device according to claim 7, wherein each of the two connecting elements has a connecting region that is designed at least partially as a ball head.

9. The lighting device according to claim 7, wherein each of the two adjusting elements is connected to one of the connecting elements.

10. The lighting device according to claim 9, wherein each of the two adjusting elements has a receptacle for the connecting region of the associated connecting element, or wherein the receptacle is designed at least partially as a socket corresponding to the ball head.

11. The lighting device according to claim 1, wherein the adjuster includes a shaft that is detachable without tools.

12. The lighting device according to claim 11, wherein the shaft includes two parts that are movable toward one another in the axial direction of the shaft against the force of a spring, or wherein the length of the shaft is reduced by a movement of the parts toward one another such that it is removable.

13. The lighting device according to claim 11, wherein the shaft couples the two adjusting elements to one another.

14. The lighting device according to claim 11, wherein the shaft is indirectly or directly connected at each of its ends to one of the threaded spindles such that a rotational motion of one of the two threaded spindles is transferred through the shaft to the other of the two threaded spindles.

15. The lighting device according to claim 1, wherein the lighting device has a control element for horizontal adjustment of the supporting frame, the control element being indirectly or directly connected to one of the threaded spindles such that a rotational motion of the control element is transferred to one of the two threaded spindles.

16. The lighting device according to claim 1, wherein the lighting device is a headlamp.

* * * * *